US007050785B2

(12) United States Patent
Islam et al.

(10) Patent No.: US 7,050,785 B2
(45) Date of Patent: May 23, 2006

(54) APPARATUS AND METHOD OF EXPLICIT INDICATION OF CALL FROM EMERGENCY CALL CENTRE

(75) Inventors: M. Khaledul Islam, Kanata (CA); William Daniel Willey, San Francisco, CA (US); Luis P. Estable, Gatineau (CA)

(73) Assignee: Research In Motion Limited, Waterloo, CA (US)

( * ) Notice: Subject to any disclaimer, the term of this patent is extended or adjusted under 35 U.S.C. 154(b) by 178 days.

(21) Appl. No.: 10/730,144

(22) Filed: Dec. 8, 2003

(65) Prior Publication Data

US 2005/0124316 A1   Jun. 9, 2005

(51) Int. Cl.
*H04Q 7/20* (2006.01)
(52) U.S. Cl. ............................. 455/404.1; 455/404.2; 455/456.1; 455/422.1
(58) Field of Classification Search ............. 455/404.1, 455/404.2, 456.1, 445, 457, 422.1
See application file for complete search history.

(56) References Cited

U.S. PATENT DOCUMENTS

| | | | |
|---|---|---|---|
| 5,764,747 A | | 6/1998 | Yue et al. |
| 6,070,065 A * | | 5/2000 | Armbruster et al. ...... 455/404.2 |
| 6,198,914 B1 * | | 3/2001 | Saegusa .................... 455/404.2 |
| 6,246,752 B1 * | | 6/2001 | Bscheider et al. ........ 379/88.22 |
| 6,879,819 B1 * | | 4/2005 | Brooks ..................... 455/404.1 |
| 2001/0023187 A1 * | | 9/2001 | Wilhelm .................... 455/518 |
| 2002/0173317 A1 | | 11/2002 | Nykanen et al. |
| 2004/0002329 A1 * | | 1/2004 | Bhatia et al. ............. 455/422.1 |
| 2004/0176066 A1 * | | 9/2004 | Binzel et al. ............. 455/404.1 |
| 2004/0203622 A1 * | | 10/2004 | Esque et al. .............. 455/412.1 |
| 2004/0203876 A1 * | | 10/2004 | Drawert et al. .......... 455/456.1 |
| 2005/0003797 A1 * | | 1/2005 | Baldwin .................. 455/404.1 |
| 2005/0032504 A1 * | | 2/2005 | Camp ....................... 455/404.2 |
| 2005/0101287 A1 * | | 5/2005 | Jin et al. .................. 455/404.1 |

FOREIGN PATENT DOCUMENTS

| | | |
|---|---|---|
| EP | 1 124 394 A1 | 8/2001 |
| EP | 1 136 967 A2 | 9/2001 |
| EP | 1 168 872 A1 | 1/2002 |
| WO | WO 98/31180 A1 | 7/1998 |
| WO | WO 00/49829 A1 | 8/2000 |

* cited by examiner

*Primary Examiner*—Joseph Feild
*Assistant Examiner*—Kamran Afshar
(74) *Attorney, Agent, or Firm*—Jones Day; Krishna K. Pathiyal; Robert C. Liang

(57) ABSTRACT

Herein are disclosed an apparatus and method of explicit indication of call from emergency call center. The method includes the steps of forming an emergency signal in relation to the mobile station terminated call; sending the emergency signal to the mobile station on behalf of the emergency call center; and detecting the emergency signal at the mobile station. The apparatus includes emergency signal forming means for forming an emergency signal in relation to the mobile station terminated call; emergency signal sending means for sending said emergency signal to the mobile station on behalf of the emergency call center; and emergency signal detecting means for detecting said emergency signal at the mobile station. A global emergency call information record is disclosed for use in cdma2000 type networks and the like. The apparatus and method may apply to other networks.

29 Claims, 4 Drawing Sheets

APPARATUS AND METHOD OF EXPLICIT INDICATION OF CALL FROM EMERGENCY CALL CENTRE

CROSS REFERENCE TO RELATED APPLICATION

N/A

BACKGROUND

1. Technical Field

This application relates to mobile communication techniques in general, and to an apparatus and method of explicit indication of call from emergency call centre, in particular.

2. Description of the Related Art

When a mobile station places an emergency call, the network typically routes the call to an emergency call centre such as Public Safety Answering Point (PSAP). When the emergency call ends, the MS typically stays in an emergency callback mode for at least the duration of time known as the emergency callback period. During this time, the Emergency Call Centre may attempt to callback the MS.

Mobile stations that subscribe to caller id may attempt to determine that an incoming call is a callback from an emergency call centre by screening the caller id of incoming calls. However, this may not work if the caller id is not recognized as belonging to an emergency call centre. Furthermore, this will not work if the user of the mobile station has not subscribed to the caller id service, or even having subscribed to the caller id service, if a caller invokes caller id restriction when placing a call to the user during the emergency callback period. In addition, if the user does not subscribe to the call-waiting feature, this may prevent the emergency call centre from reaching the user if the user decides to take a non-emergency voice call. This could also happen at any time outside of emergency callback period.

Consequently, there is a need for a standard mechanism on mobile stations to adequately differentiate between an incoming call from an Emergency Call Centre, and an incoming non-emergency call.

SUMMARY

According to one aspect of the present application, there is provided a method of explicitly indicating that a mobile station terminated call is from an emergency call centre, the method comprising the steps of: forming an emergency signal in relation to the mobile station terminated call; sending said emergency signal to the mobile station on behalf of the emergency call centre; and detecting said emergency signal at the mobile station.

According to another aspect of the present application, there is provided an apparatus for explicitly indicating that a mobile station terminated call is from an emergency call centre, the apparatus comprising: emergency signal forming means for forming an emergency signal in relation to the mobile station terminated call; emergency signal sending means for sending said emergency signal to the mobile station on behalf of the emergency call centre; and emergency signal detecting means for detecting said emergency signal at the mobile station.

Other aspects and features of the present application will become apparent to those ordinarily skilled in the art upon review of the following description of specific embodiments of an apparatus and method of explicit indication of call from emergency call centre in conjunction with the accompanying figures.

BRIEF DESCRIPTION OF THE DRAWINGS

Embodiments of the present application will now be described, by way of example only, with reference to the attached figures, wherein.

Same reference numerals are used in different figures to denote similar elements.

DETAILED DESCRIPTION OF THE DRAWINGS

Figure 1:
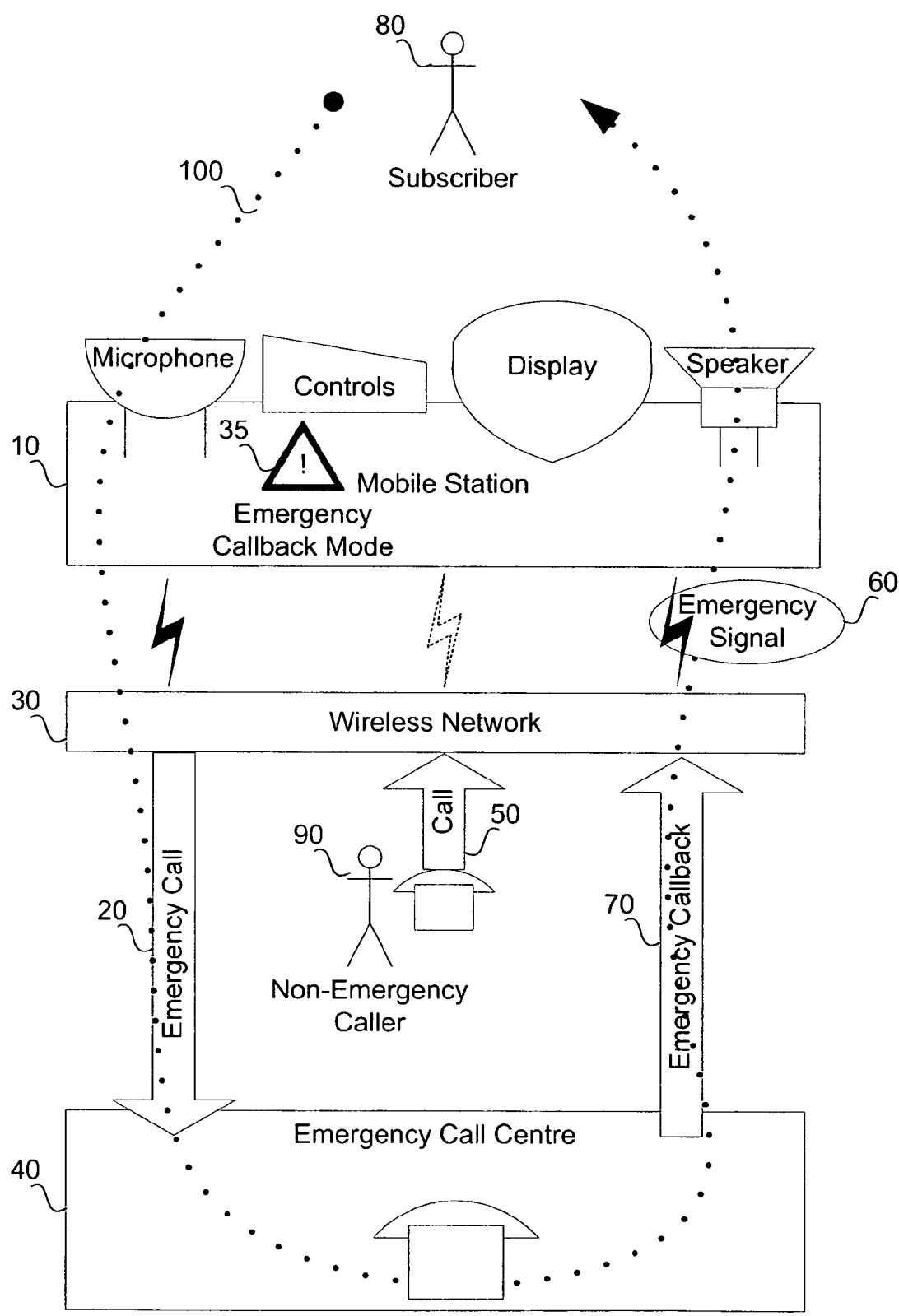
FIG. 1 is a block diagram illustrating a mobile station in one embodiment of the apparatus and method of the current application.

Referring to FIG. 1, FIG. 1 is a block diagram illustrating a mobile station in one embodiment of the apparatus and method of the current application. When a mobile station 10 places an emergency call 20, the wireless network 30 typically routes the call to an emergency call centre 40 such as a Public Safety Answering Point (PSAP). After the emergency call 20 ends, due to normal termination or fading, the mobile station 10 typically stays in emergency callback mode 35 for a certain duration. The idea is to stay on the system so that emergency call centre 40 can call the subscriber 80 back if necessary.

Advantageuosly, by providing a new emergency signal 60 in accordance with the apparatus and method of the present application, FIG. 1 shows that mobile station 10 is enabled to adequately differentiate between an incoming non-emergency call 60 and an incoming call from emergency call centre 40, such as emergency callback 70.

Further advantageously, mobile station 10 is enabled to block any non-emergency calls destined to the mobile station 10, such as but not limited to non-emergency call 50, while mobile station 10 is in emergency callback mode 35.

Yet further advantageously, subscriber 80 operating mobile station 10 has not had to rely on caller id in order to determine that an incoming call, such as one of call 50 and call 70, is from an emergency call centre 40, and this even if caller 90 invokes caller id restriction when placing call 50 to the subscriber 80.

Yet further still advantageously, even if subscriber 80 did not subscribe to a call-waiting feature for mobile station 10, emergency call centre 40 is systematically enabled to callback mobile station 10. Stated otherwise, in the absence of emergency signal 60 provided in accordance with the apparatus and method of the present application, the lack of call-waiting may traditionally prevent emergency call centre 40 from reaching the subscriber 80 if the subscriber decides to take a non-emergency voice call.

These advantages can work together to enable an apparently continuos emergency call 100 whereby mobile station originated emergency call 20, mobile station terminated emergency call 70, and any subsequent mobile station terminated emergency calls thereto can be made to appear to subscriber 80 as though one continuous emergency call 100 results from mobile originated emergency call 20, and this independent of fade-outs, non-emergency call attempts, such as 50, to reach the mobile station 10, the presence or absence of call waiting functionality at the mobile station 10, and the presence or absence of caller id functionality at the mobile station 10. This is analagous to how a "911" call is handled on fixed line circuit switched phone call, i.e. the circuit remains "open" to provide a life line to the caller.

Figure 2:
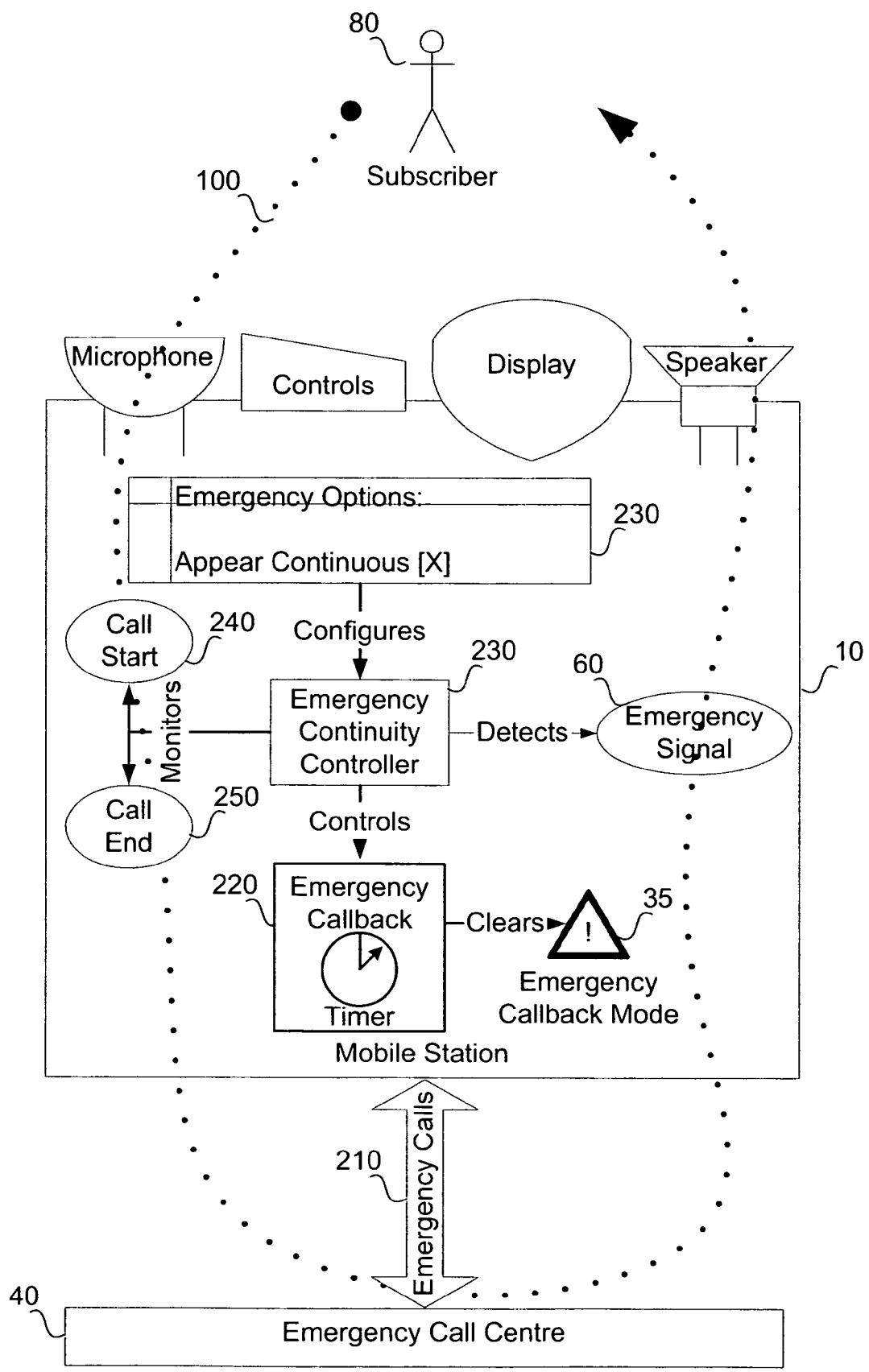
FIG. 2 is a block diagram illustrating in greater detail the apparently continuous emergency call aspect provided in accordance with one embodiment of the apparatus and method of the current application.

Turning now to FIG. 2, FIG. 2 is a block diagram illustrating in greater detail the apparently continuous emergency call aspect provided in accordance with one embodiment of the apparatus and method of the current application. During emergency calls 210, such as emergency call 20 and emergency callback 70 of FIG. 1, mobile station 10 maintains an emergency callback timer 220 controlled by emergency continuity controller 230. Emergency continuity controller monitors the start of all calls 240, the end of all calls 250, as well as detecting emergency signal 60, to ensure that if subscriber 80 sets emergency options 230 to appear continuous, regardless of how many mobile originated or mobile terminated calls occur in emergency calls 210, these substantially appear as a single continuous emergency call 100 to subscriber 80.

Operationally, when subscriber 80 makes an emergency call, such as emergency call 20 of FIG. 1, emergency continuity controller 220 monitors the start call start 240, determines that an emergency call has been requested, and prepares to monitor the call end 250. When the emergency call ends, emergency continuity controller 230 starts emergency callback timer 220, which places the mobile station 10 in emergency callback mode 35.

When an incoming call arrives, emergency continuity controller 230 determines if emergency signal 60 was detected to indicate that the incoming call, such as emergency callback 70, was from emergency call centre 40. If so determined, emergency continuity controller examines the emergency options 230 to determine if the emergency calls 210 should appear continuous. If so determined, emergency continuity controller 230 handles call set up on behalf of subscriber 80, for example by answering the call automatically if subscriber 80 does not answer within certain time and/or by enabling speakerphone capability if mobile station 10 is so equipped. Emergency continuity controller 230 may additionally determine if the emergency callback mode 35 is still active, and if so, resets the emergency callback timer 220 once the incoming emergency call starts.

Conversely, if emergency signal 60 was not detected, emergency continuity controller can rely on other traditional techniques such as caller id and call waiting to assist subscriber 80, or block the incoming call to ensure that emergency call centre 40 is able to reach subscriber 80 for at least the duration of emergency callback timer 220.

Given the ability to make one or more emergency calls 210 substantially appear as one continuous emergency call, it is envisaged to be within the scope of the present application to have a mobile station deliberately terminate either of the mobile originated or mobile terminated emergency calls. In one CDMA embodiment, since some CDMA frequencies can interfere with GPS frequencies, it is envisaged that the mobile station deliberately terminates an emergency call so as to turn its CDMA transmitter off to make accurate GPS measurements for emergency location services. Once the GPS measurements have been taken the mobile station turns it's CDMA transmitter back on and awaits to detect an emergency signal from the emergency call centre, or originates a new call to the emergency call centre to provide location information and benefit from location based services. Since it is the mobile station which is performing these acts on behalf of the subscriber, it appears to the subscriber as if one continuous emergency call is in progress.

It is also envisaged to be within the scope of the present application to have the emergency call centre or wireless network deliberately discontinue either of the mobile originated or mobile terminated emergency calls. In one exemplary embodiment for example, it is envisaged that the emergency call centre deliberately drop the emergency call in order to enable first responders, such as the fire department, police, or ambulance, to be able to reach the mobile station and communicate with the subscriber.

It is also further envisaged to combine both of these deliberate termination of emergency calls so as to first enable the mobile station to determine it's location, to provide the mobile station location to the emergency call centre, and then enable the emergency call centre to hand the mobile station off to a first responder which is nearest to the determined location of the mobile station, all the while maintaining the appearance of a single emergency call to the mobile station subscriber.

Figure 3:
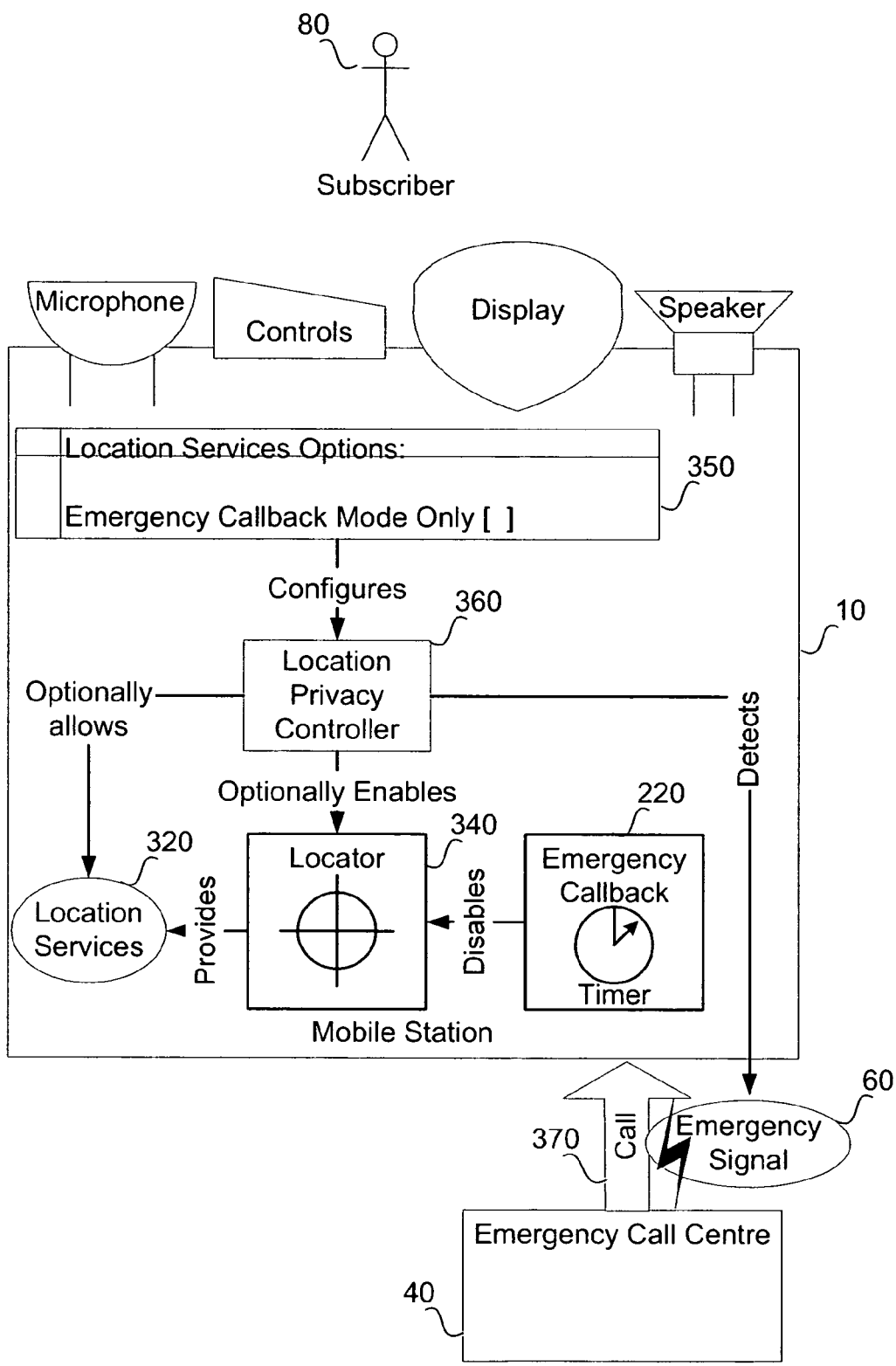
FIG. 3 is a block diagram illustrating in greater detail the location privacy aspect provided in accordance with one embodiment of the apparatus and method of the current application.

Turning now to FIG. 3, FIG. 3 is a block diagram illustrating in greater detail the location privacy aspect provided in accordance with one embodiment of the apparatus and method of the current application. In FIG. 3, the presence of an explicit indication that the call is indeed from an emergency call centre, such as the presence of emergency signal 60, can advantageously enable the resolution of privacy issues associated with location services 320. For example, the subscriber 80 can decide to allow location services 220 if he/she gets a call 370 from emergency call centre 40 outside of emergency callback period. In the exemplary embodiment shown in FIG. 3, if the emergency callback timer 220 expires, then the locator 340 that provides location services 320 is disabled. An example locator is a GPS measurement device, which makes measurements of GPS signals and conveys these measurements to the wireless network to process and send back location information. In FIG. 3, mobile station 10 is not currently operating in emergency callback mode when location privacy controller 360 detects emergency signal 60. If location service options 350 configure location privacy controller 360 to allow location services outside emergency callback mode, then locator 340 and location services 320 are enabled. Conversely, if location privacy controller 360 is configured not to allow location services outside emergency callback mode, then also advantageously locator 340 and location services 320 are disabled. Regardless of location service options, location privacy controller 360 preferably enforces any requirements mandated by law, such as for example ensuring locator 340 and location services 320 are enabled during emergency callback mode, if so required. This is illustrated in greater detail in FIG. 4.

Figure 4:
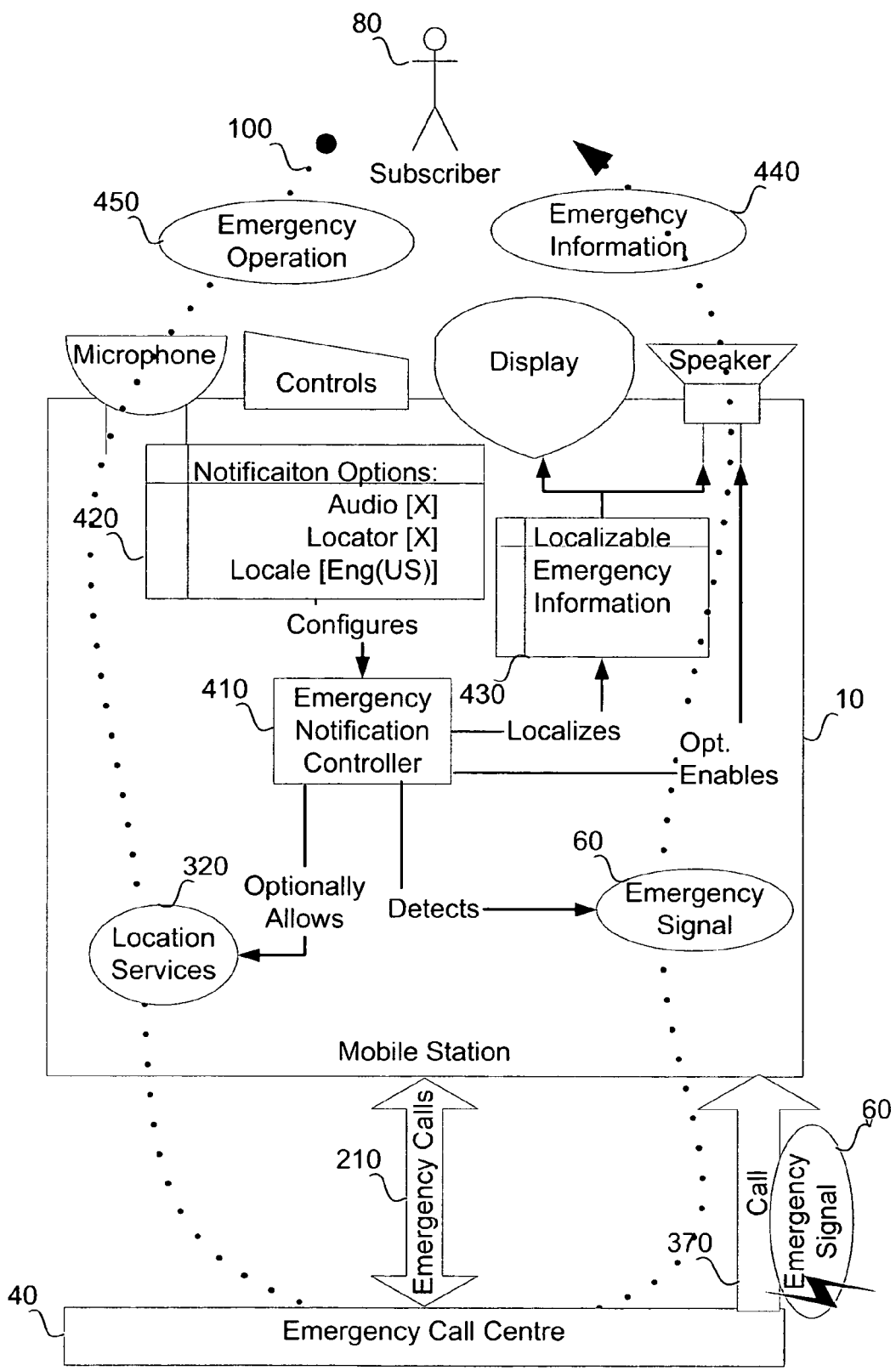
FIG. 4 is a block diagram illustrating in greater detail the emergency notification aspect provided in accordance with one embodiment of the apparatus and method of the current application.

Turning to FIG. 4, FIG. 4 is a block diagram illustrating in greater detail the emergency notification aspect provided in accordance with one embodiment of the apparatus and method of the current application. The detection of an emergency signal can improve emergency roaming conditions when the subscriber may not even understand the language of local emergency call centre service, but may still want to allow location services 320 if there is an explicit language-independent indication from the network.

Referring to FIG. 4, the subscriber 80 can decide to allow location services 320, such as GPS location services, if he/she gets a call 370 from the emergency call centre 40 outside of emergency callback period so long as that call includes emergency signal 60. Emergency notification controller 410 determines if there is an explicit network indication that the call is indeed from emergency call centre 40. If so determined, emergency notification controller 410, depending on notification options 420, can decide to allow location services 320 if mobile station 10 gets a call from emergency call centre outside of emergency callback period. Advantageously, notification options 420 include the preferred locale of subscriber 80, so that emergency notification controller 410 localizes localizable emergency information 430 to provide useable emergency information 440 to subscriber 80.

The precise nature of the emergency information 440 may further depend on the notification options 420 as configured through emergency operation 450 by subscriber 80, either prior to or during emergency calls. Emergency information 440 is preferably adapted to the preferred locale of the subscriber 80 so that when subscriber 80 observes emergency information 440 it is in a form that is readily understood.

For example, consider a subscriber 80 who's preferred locale is "English (U.S.)", as illustrated in notification options 420. Regardless of where subscriber 80 is roaming with his mobile station 10, localized emergency information that is readily understood by the subscriber, such as the "English (U.S.)" localized message "Emergency Call", is observed in emergency information 440. Another subscriber who's preferred locale is "Français" would observe a message such as "Appel d'urgence", while yet another subscriber who's preferred locale is "Español" would observe a message such as "Llamad de emergencia".

One of many mechanisms that can be used at the mobile station 10 to accomplish this is to use tables to store the various localized emergency information, and then use the locale to look up the localized emergency information within the tables. To continue with the example "Emergency Call" message above, a table EMERGENCY_CALL could be provided in localizable emergency information 430. EMERGENCY_CALL could include the following emergency information messages {"Emergency Call", "Emergency Call", "Emergency Call", "Emergency Call", "Appel d'urgence", "Llamada de emergencia", "Chiamata di emergenza", "Notruf"} each of which corresponds to the following locales {"English (U.S.)", "English", "English (United Kingdom)", "English (Nederland)", "Français", "Español", "Italiano", "Dutch"}.

Although not expressly shown in FIG. 4, instead of indicating a single preferred locale in notification options 420, it is envisaged that subscriber 80 may want to rank them in order of preference. Thus, using the list of locales as an example of a preferred ranking, if emergency notification controller 410 cannot find localizable emergency information 440 corresponding to the preferred locale of the subscriber 80, emergency notification controller proceeds to attempt to find localizable emergency information 440 for each of the next preferred locales in order, i.e. it tries "English (U.S.)", "English", "English (United Kingdom)", "English (Nederland)", "Français", "Español", "Italiano", and finally "Dutch". If no localizable emergency information can be located after exhausting the preferred ranking of locales, pre-programmed default emergency information is used.

Although not expressly shown in the drawings, it is contemplated that localizable emergency information may further depend on the nature of the emergency. For example, if emergency signal 60 carries an emergency code to qualify the nature of the emergency, then emergency notification controller 410 advantageously provides localized emergency information to enable subscriber 80 to better cope with the nature of the specific emergency. The emergency call centre could have, for example, determined the emergency signal code corresponding to the nature of the emergency, and may even update the code during the emergency call or callback. Thus, the specific emergency information observed by a subscriber who has just experienced a car collision could be different than the specific emergency information observed by a subscriber who is attempting to deliver a baby.

Although messages were used in the above example for localizable emergency information, localizable non-textual emergency information may also be included in localizable emergency information 430. The types of emergency information 440 which may be observed by subscriber 80 include, but is not limited to, text, audio, audible signals, icons, graphics, pictures, pictograms, guidelines, instructions or just about any other type of information which may be helpful in assisting the subscriber during the emergency.

One mechanism which could accomplish this flexibility would be to provide a list of localizable URLs so that the mobile station could fetch the various types of emergency information using a highly standardized emergency browser. These URLs could either be stored locally in the mobile station, or preferably be updated automatically, either prior to or during an emergency call. In the latter case, the URLs could, for example, be included along with the above mentioned emergency code in the emergency signal.

Furthermore, to enforce the apparent continuity of emergency services, it is envisaged that some notifications remain observable throughout multiple emergency calls. For example, the message "Emergency Call" may be continually displayed transparently over the visual interface, while an audible repetitive "Beep" may be heard. The specific type of notification may also further be limited depending on the nature of the emergency. For instance, it may be detrimental to the subscriber if the repetitive "Beep" is heard if the nature of the emergency requires the subscriber to remain silent. As another example, instead of talking to the subscriber, the nature of the emergency may suggest that the emergency centre use short messaging service instead of a voice call to communicate emergency information to the subscriber.

Thus subscriber 80 is thus enabled to receive emergency services under roaming conditions even when the user may not understand the language of local emergency call centre service, but may still allow location services if there is an explicit language-independent indication from the network.

Returning now to the concept of the emergency signal, any explicit indication that is conveyed to the subscriber of a mobile station for mobile station terminated calls from an emergency centre is a valid alternative. With such a mechanism provided, in view of the present application, then the subscriber will be able to make better decisions whether to take an incoming call or not when he/she is expecting a call from the emergency centre. This concept can be applied to a first incoming call as well as any call-waiting call.

In case of a cdma2000 standards based embodiment, an explicit indication, i.e. an emergency signal, can be provided as follows. Define a new information record to indicate global emergency callback, similar to current Global Emergency Call Record defined in ballot version of IS-2000 release D for mobile-originated calls. The network includes this new record when it sends "Alert/Flash with Info" (AWI/FWI) message to alert the user of incoming call from emergency call centre. If the subscriber does not have call-waiting, then he/she can decide whether to take a call during emergency callback period or anytime after that. The network includes this new record when it sends Flash with Info message to alert the user of incoming call-waiting call from an emergency call centre when the user is in call. This is applicable when the user has call-waiting feature.

The details of a specific exemplary cdma2000 standard embodiment are made clearer by considering some changes that could be made to the cdma2000 standard in order to support the techniques of this application. First, consider the proposed change to Table 3.7.5-1:

| Information Record | Record Type (binary) | Message Type | f-csch | f-dsch | P_REV_IN_USE[1] |
|---|---|---|---|---|---|
| Proposed Information Record | | | | | |
| Global Emergency Call | 00010111 | AWI FWI | N N | Y Y | ^11 |

Next, consider the addition of paragraph 3.7.5.24:
  3.7.5.24 Global Emergency Call
    This information record allows the network to inform the mobile station that a call is an emergency callback call from the PSAP
    This information record includes no type-specific fields.
  The above-described embodiments of the present application are intended to be examples only. Those of skill in the art may effect alterations, modifications and variations to the particular embodiments without departing from the scope of the application.

We claim:

1. A method of explicitly indicating that a mobile station terminated call is from an emergency call centre, the method comprising the steps of:
   providing location privacy at the mobile station;
   placing a mobile station originated emergency call;
   maintaining an emergency callback timer having an emergency callback period during which the mobile station operates in emergency callback mode; and
   determining if the mobile terminated emergency call occurs outside of the emergency callback period; and if so determined then enabling location services.

2. The method of claim 1, further comprising:
   forming an emergency signal in relation to the mobile station terminated call;
   sending said emergency signal to the mobile station on behalf of the emergency call centre; and
   detecting said emergency signal at the mobile station.

3. The method as recited in claim 1, further comprising the step of receiving the mobile station terminated emergency call.

4. The method as recited in claim 3, further comprising the step of maintaining an apparently continuous emergency call.

5. The method as recited in claim 4, further comprising the step of automatically transitioning from said mobile station originated emergency call to the mobile terminated emergency call.

6. The method as recited in claim 4, further comprising the step of blocking a non-emergency mobile station terminated call in favour of one of said mobile station originated emergency call and the mobile terminated emergency call.

7. The method as recited in claim 1, further comprising the step of determining if the mobile terminated emergency call occurs outside of the emergency callback period, and if so determined resetting the emergency callback timer so as to cause the mobile station to operate in emergency callback mode.

8. The method as recited in claim 1, further comprising the step of determining the location of the mobile station.

9. The method as recited in claim 4, wherein the apparently continuous emergency call comprises at least one call with a first responder.

10. The method as recited in claim 9, wherein the location of the mobile station is communicated to said first responder.

11. The method as recited in claim 1, further comprising determining if the mobile station is configured to allow location services outside the emergency callback period; and if so determined then preventing location services from being enabled outside the emergency callback period.

12. The method as recited in claim 1, determining if the emergency callback timer has expired; and if so determined then disabling location services.

13. The method as recited in claim 2, further comprising the step of notifying emergency information at the mobile station.

14. The method as recited in claim 13, wherein said emergency information is derived from said emergency signal.

15. The method as recited in claim 14, further comprising the step of adapting said emergency information to be more readily understood by the subscriber of the mobile station.

16. The method as recited in claim 15, further comprising the step of determining a locale at the mobile station.

17. The method as recited in claim 16, wherein said locale is a default locale at the mobile station.

18. The method as recited in claim 16, wherein said locale is a preferred locale at the mobile station.

19. The method as recited in claim 16, wherein said locale is a function of a preferred ranking of locales at the mobile station.

20. The method as recited in claim 14, wherein said emergency signal includes an emergency code.

21. The method as recited in claim 20, wherein said emergency information is a function of said emergency code.

22. The method as recited in claim 20, wherein said emergency code describes the nature of the emergency in a non-localized fashion.

23. The method as recited in claim 20, wherein said emergency code is determined by the emergency call centre as a function of the nature of the emergency ascertained during the mobile station terminated call.

24. The method as recited in claim 2, wherein said emergency signal includes a global emergency call record.

25. The method as recited in claim 2, wherein said emergency signal is sent in an alert with info message.

26. The method as recited in claim 2, wherein said emergency signal is sent in a flash with info message.

27. The method as recited in claim 2, further comprising the step of automatically answering the mobile station terminated emergency call.

28. The method as recited in claim 27, further comprising the step of waiting for the subscriber to manually answer the mobile station terminated emergency call for a predetermined amount of time before automatically answering the mobile station terminated emergency call.

29. The method as recited in claim 27, further comprising the step of determining if the mobile station has speakerphone capability, and if so determined turning on the speakerphone automatically.

* * * * *